US010541438B2

(12) United States Patent
Trimble et al.

(10) Patent No.: US 10,541,438 B2
(45) Date of Patent: Jan. 21, 2020

(54) SYSTEMS AND METHODS FOR MANAGEMENT OF ADDITIVES IN ELECTROCHEMICAL CELLS

(71) Applicant: NANTENERGY, INC., Scottsdale, AZ (US)

(72) Inventors: Todd Trimble, Phoenix, AZ (US); Ramkumar Krishnan, Scottsdale, AZ (US); Sergey Puzhaev, Scottsdale, AZ (US); Grant Friesen, Fountain Hills, AZ (US)

(73) Assignee: NANTENERGY, INC., Scottsdale, AZ (US)

( * ) Notice: Subject to any disclaimer, the term of this patent is extended or adjusted under 35 U.S.C. 154(b) by 0 days.

(21) Appl. No.: 16/207,484

(22) Filed: Dec. 3, 2018

(65) Prior Publication Data
US 2019/0103614 A1 Apr. 4, 2019

Related U.S. Application Data

(62) Division of application No. 15/006,510, filed on Jan. 26, 2016, now Pat. No. 10,153,503.

(60) Provisional application No. 62/108,262, filed on Jan. 27, 2015.

(51) Int. Cl.
*H01M 8/02* (2016.01)
*H01M 8/04* (2016.01)
(Continued)

(52) U.S. Cl.
CPC ............ *H01M 8/0482* (2013.01); *H01M 8/02* (2013.01); *H01M 8/188* (2013.01); *H01M 8/22* (2013.01);
(Continued)

(58) Field of Classification Search
CPC ...... H01M 8/02; H01M 8/0482; H01M 8/188; H01M 8/22; H01M 12/02; H01M 12/04; H01M 12/06; H01M 12/08
See application file for complete search history.

(56) References Cited

U.S. PATENT DOCUMENTS 8,741,491 B2  6/2014  Wolfe et al.
8,877,391 B2  11/2014  Friesen et al.
(Continued)

OTHER PUBLICATIONS

International Search Report & Written Opinion dated May 12, 2016, International Application No. PCT/US2016/014936.
(Continued)

*Primary Examiner* — Brittany L Raymond
(74) *Attorney, Agent, or Firm* — Pillsbury Winthrop Shaw Pittman, LLP

(57) ABSTRACT

The present disclosure relates to an electrochemical cell comprising a fuel electrode for oxidizing a fuel, an oxidant electrode for reducing an oxidant, and an ionically conductive medium for conducting ions between the fuel and oxidant electrodes to support electrochemical reactions at the fuel and oxidant electrodes. The ionically conductive medium comprises at least one active additive for enhancing (controlling the rate, overpotential and/or the reaction sites for) at least one electrochemical reaction within the cell. The cell further comprises an additive medium in contact with the ionically conductive medium and containing the at least one active additive capable of corroding or dissolving in the ionically conductive medium. The additive medium and/or casing is configured to release the active additive to the ionically conductive medium as a concentration of the active additive in the ionically conductive medium is depleted during operation of the cell.

25 Claims, 17 Drawing Sheets

(51) Int. Cl.
  *H01M 8/18*     (2006.01)
  *H01M 8/22*     (2006.01)
  *H01M 12/02*    (2006.01)
  *H01M 12/04*    (2006.01)
  *H01M 12/06*    (2006.01)
  *H01M 12/08*    (2006.01)
  *H01M 8/04791*  (2016.01)

(52) U.S. Cl.
  CPC ........... *H01M 12/02* (2013.01); *H01M 12/04* (2013.01); *H01M 12/06* (2013.01); *H01M 12/08* (2013.01); *Y02E 60/128* (2013.01)

(56) References Cited

U.S. PATENT DOCUMENTS

| 9,147,919 B2     | 9/2015  | Friesen et al.  |
| 2012/0052404 A1  | 3/2012  | Friesen et al.  |
| 2012/0321969 A1  | 12/2012 | Friesen et al.  |
| 2013/0285597 A1  | 10/2013 | Goldstein       |
| 2014/0266055 A1  | 9/2014  | Trimble et al.  |
| 2015/0221999 A1  | 8/2015  | Friesen et al.  |

OTHER PUBLICATIONS

International Preliminary Report on Patentability PCT/US2016/014936 dated Aug. 1, 2017.
Non-final Office Action issued in U.S. Appl. No. 15/006,510 dated Mar. 22, 2018.
Notice of Allowance U.S. Appl. No. 15/006,510 dated Aug. 8, 2018.

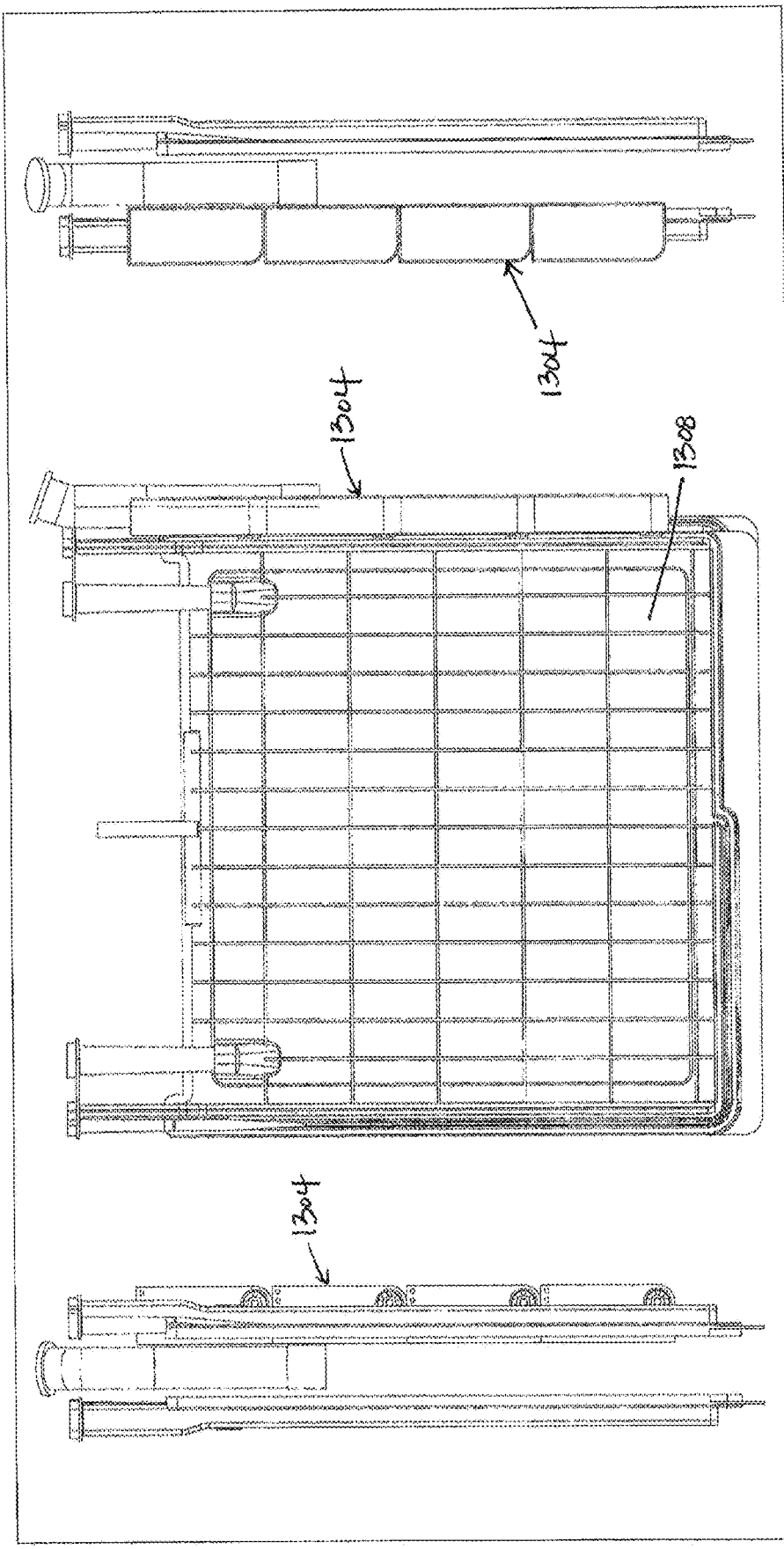

DETAIL A
SCALE 1 : 1

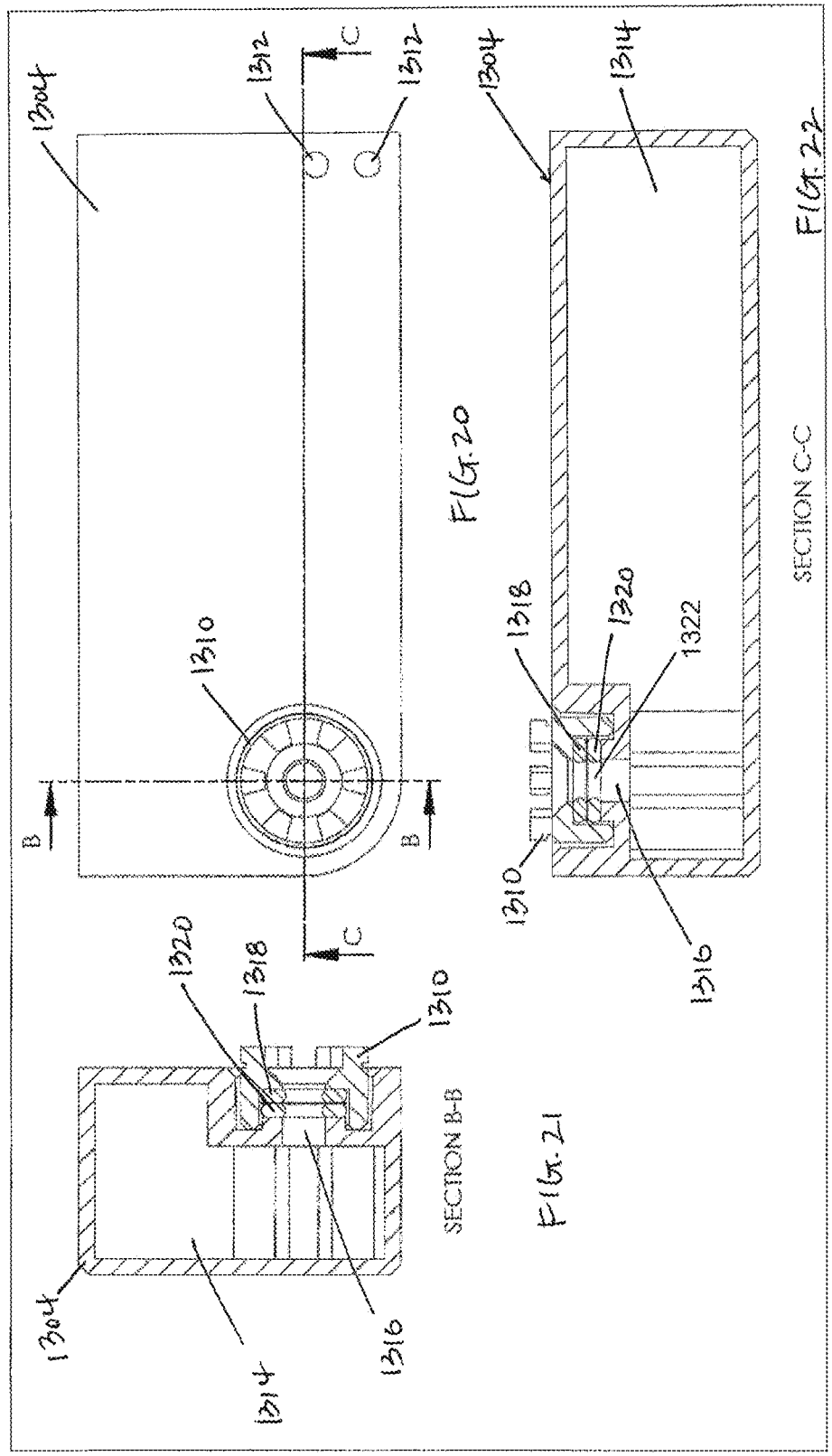

SYSTEMS AND METHODS FOR MANAGEMENT OF ADDITIVES IN ELECTROCHEMICAL CELLS

CROSS REFERENCE TO RELATED APPLICATION

This application is a Divisional Application of U.S. Ser. No. 15/006,510, filed Jan. 26, 2016, which claims priority to U.S. Patent Application No. 62/108,262, filed Jan. 27, 2015. The subject matter of each is incorporated herein by reference in entirety.

FIELD

The present disclosure is generally related to electrochemical cells comprising electrolyte additives, and more particularly to systems and methods for managing additives in electrochemical cells.

BACKGROUND

Electrochemical cells/batteries utilize an electrolyte solution as an ionically conductive medium. In an electrochemical cell using metal as the fuel, the metal fuel is oxidized during discharge to reducible metal fuel ions at a fuel electrode functioning as an anode. During charging, the reducible metal fuel ions are reduced to metal fuel at the fuel electrode, which is now functioning as a cathode. During this process, the metal fuel plates the fuel electrode through electrodeposition.

Various additives may be added to the electrolyte of an electrochemical cell to enhance the operation of the cell. In the absence of maintenance, however, additives may be consumed by a variety of mechanisms over the lifetime of the cell which translates to limitations in cell efficiency and lifetime.

Among other things, the present application endeavors to provide an effective and improved way of managing the concentration of additives in an electrochemical cell.

SUMMARY

One aspect of the disclosure provides an electrochemical cell comprising a fuel electrode for oxidizing a fuel, an oxidant electrode for reducing an oxidant, and an ionically conductive medium for conducting ions between the fuel and oxidant electrodes to support electrochemical reactions at the fuel and oxidant electrodes. The ionically conductive medium comprises at least one active additive for enhancing (e.g., controlling the rate, overpotential and/or the preferred reaction sites for) at least one electrochemical reaction within the cell. The electrochemical cell further comprises an additive medium in contact with the ionically conductive medium. The additive medium may contain the at least one active additive for corroding or dissolving in the ionically conductive medium. In some embodiments, the additive medium (and/or the carrier (or container)) for the additive medium contains at least one metal for corroding or dissolving in the ionically conductive medium. The additive medium is configured to release the active additive to the ionically conductive medium to increase a concentration of the active additive in the ionically conductive medium depleted in the cell.

Another aspect of the disclosure provides an electrochemical cell comprising a fuel electrode for oxidizing a fuel, an oxidant electrode for reducing an oxidant, and an ionically conductive medium for conducting ions between the fuel and oxidant electrodes to support electrochemical reactions at the fuel and oxidant electrodes. The ionically conductive medium comprises at least one active additive for enhancing at least one electrochemical reaction within the cell. The electrochemical cell further comprises an additive containing medium comprising a casing enclosing the at least one active additive therein. The casing may be corrodible or dissolvable in the ionically conductive medium to expose and release the active additive to the ionically conductive medium to increase a concentration of the active additive depleted in the ionically conductive medium.

Another aspect of the disclosure provides a method of adding an active additive to an electrochemical cell comprising a fuel electrode for oxidizing a fuel, an oxidant electrode for reducing an oxidant, and an ionically conductive medium for conducting ions between the fuel and oxidant electrodes to support electrochemical reactions at the fuel and oxidant electrodes, wherein the ionically conductive medium comprises at least one active additive for enhancing at least one electrochemical reaction within the cell. The method comprises disposing an additive medium in contact with the ionically conductive medium, the additive medium containing the at least one active additive for corroding or dissolving in the ionically conductive medium, the additive being configured to release the active additive to the ionically conductive medium to increase a concentration of the active additive depleted in the ionically conductive medium.

Another aspect of the disclosure provides a method of adding an active additive to an electrochemical cell comprising a fuel electrode for oxidizing a fuel, an oxidant electrode for reducing an oxidant, and an ionically conductive medium for conducting ions between the fuel and oxidant electrodes to support electrochemical reactions at the fuel and oxidant electrodes, wherein the ionically conductive medium comprises at least one active additive for enhancing at least one electrochemical reaction within the cell. The method comprises disposing an additive medium in contact with the ionically conductive medium, the additive medium comprising a casing enclosing the active additive therein, the casing being corrodible or dissolvable in the ionically conductive medium to expose and release the active additive to the ionically conductive medium to increase a concentration of the active additive depleted in the ionically conductive medium.

Other features and advantages of the present disclosure will become apparent from the following detailed description, the accompanying drawings, and the appended claims.

BRIEF DESCRIPTION OF THE DRAWINGS

Embodiments of the disclosure will now be described, by way of example only, with reference to the accompanying schematic drawings in which corresponding reference symbols indicate corresponding parts, and in which:

FIGS. 16, 17, and 18 show a left side view, a front view, and a right side view of the assembly and electrochemical cell housing of FIG. 15.

FIG. 20 shows a detailed view of a left side of the dosing container of FIG. 19.

FIG. 21 is a sectional view of the dosing container taken along line B-B in FIG. 20.

FIG. 22 is a sectional view of the dosing container taken along line C-C in FIG. 20.

DETAILED DESCRIPTION

Figure 1:
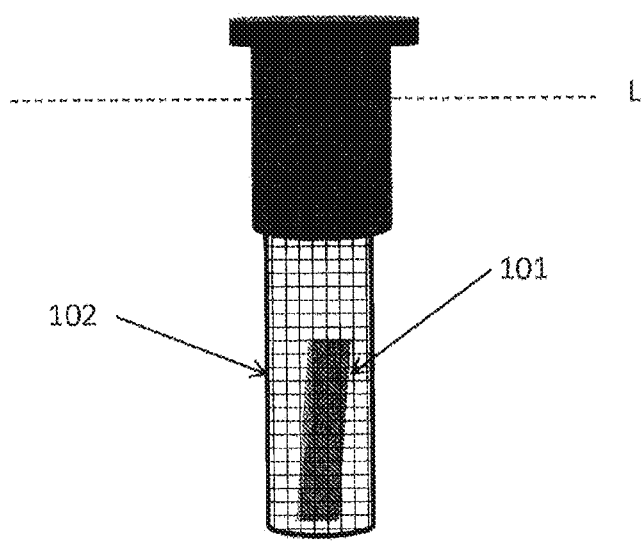
FIG. 1 shows an embodiment of an assembly for managing additives in an electrochemical cell comprising a mesh basket and a metal foil.

One embodiment described herein provides for an electrochemical cell comprising a fuel electrode for oxidizing a fuel, an oxidant electrode for reducing an oxidant, and an ionically conductive medium for conducting ions between the fuel and oxidant electrodes to support electrochemical reactions at the fuel and oxidant electrodes. The ionically conductive medium comprises at least one additive for enhancing at least one electrochemical reaction with the cell. For example, the additive may assist in controlling the rate, overpotential and/or the preferred reaction sites for at least one electrochemical reaction within the cell. As will be described below, embodiments of the present disclosure provide for systems and methods for managing the additives in electrochemical cells.

In an embodiment, the fuel electrode is a metal fuel electrode that functions as an anode when the cell operates in discharge, or electricity generating, mode. The fuel electrode may comprise a permeable electrode body, such as a screen that is made of any formation able to capture and retain, through electrodepositing, or otherwise, particles or ions of metal fuel from an ionically conductive medium that circulates in the cell.

The fuel may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present disclosure is not intended to be limited to any specific fuel, and others may be used. The fuel may be provided to the cell as particles suspended in the ionically conductive medium.

The fuel may be oxidized at the fuel electrode when the fuel electrode is operating as an anode, and an oxidizer, such as oxygen, may be reduced at the oxidant electrode when the oxidant electrode is operating as a cathode, which is when the cell is connected to a load and the cell is in discharge or electricity generation mode. The reactions that occur during discharge mode generate by-product precipitates, e.g., a reducible fuel species, in the ionically conductive medium. For example, in embodiments where the fuel is zinc, zinc oxide is generated as a by-product precipitate/reducible fuel species. During a recharge mode, the by-product precipitates, e.g., zinc oxide, may be reversibly reduced and deposited as the fuel, e.g., zinc, onto the fuel electrode, which functions as a cathode during recharge mode. During recharge mode, either the oxidant electrode, or a separate charging electrode, functions as the anode.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. The medium may also use a non-aqueous solvent or an ionic liquid.

In some embodiments, the ionically conductive medium comprises at least one active additive for enhancing (e.g., controlling the rate, overpotential and/or the preferred reaction sites for) at least one electrochemical reaction with the cell. The additive may be a metal-containing additive. For example, in a battery comprising a zinc electrode, indium may be provided in the electrolyte to significantly increase the hydrogen overpotential and thus increase the current efficiency of zinc plating during a charging process. It may be appreciated that indium may act as a barrier to hydrogen evolution, thereby favoring zinc deposition during application of current to the cell from an external power source, i.e. battery charging. It may be further appreciated that another functionality of additives are to improve the plating morphology of the metal fuel and suppressing dendrite formation which limits cell efficiency.

In various exemplary embodiments described herein, cationic indium may be provided as the active additive and indium metal or salt thereof (e.g., indium chloride, indium sulfate, indium phosphate, indium fluoride, indium hydroxide, etc.) as the metal-containing additive medium. The term metal-containing includes salts of the metal, or other molecules, complexes or alloys containing the metal or an ion thereof. However, any suitable additive improving the operation of electrochemical cells may be released in the electrolyte from any suitable additive medium. It may be appreciated that the reduction of hydrogen overpotential in batteries comprising a metal fuel may be achieved with various alternative additives at numerous other concentrations. For example, bismuth (Bi), tin (Sn), gallium (Ga), thallium (Tl), and various oxides or salts thereof, including diindium trioxide ($In_2O_3$), dibismuth trioxide ($Bi_2O_3$), tin oxide (SnO) and digallium trioxide ($Ga_2O_3$) may also be employed. The additive in solution may also be an anionic species. It should be appreciated that the additive may be a cationic, anionic or a neutral additive species.

In some embodiments relating to electrochemical cells comprising zinc metal fuel, the concentration of active additives may be provided less than 5 mol % (relative to Zn), less than 2 mol % (relative to Zn), or less than 1 mol % (relative to Zn). However, and especially where such elements or other compounds exhibit a relatively high solubility, concentrations of more than 5 mol % (relative to Zn) are also considered suitable.

In some embodiments, the additive medium and/or the carrier or container for the additive medium contains at least one active additive for corroding or dissolving in the ionically conductive medium. An assembly or a medium in contact with the ionically conductive medium and containing at least one active additive capable of corroding and/or dissolving in the ionically conductive medium may be configured to release the active additive to the ionically conductive medium as a concentration of the active additive in the ionically conductive medium is depleted during operation of the cell. However, the active additive species need not contain a metal or metal ions. The active additive may be released into the electrolyte through any suitable mechanism. Further, the mechanism (e.g. container, carrier, etc.) does not have to have a metal component, in accordance with embodiments herein.

FIGS. 1-5 show various exemplary embodiments of assemblies and mediums that release active additives into the electrolyte.

It should be appreciated that dosing can be continuous or discrete. For example, a soluble polymer, metal or ceramic membrane may be provided to corrode and/or dissolve, thereby instantaneously dosing a fixed quantity of additive either in a solid (e.g. powder) or liquid form. Additionally, dosing of the additive may be manual. For example, a service technician may manually add the additive and/or additive medium to the cell. Manual addition may be performed according to a predetermined schedule, a measurement relating to cell health and so on.

FIG. 1 shows an embodiment of an assembly 100 that relies on free corrosion (or dissolving) of an additive medium 101 to maintain the concentration of the additive in the electrochemical cell. Assembly 100 includes a container 102 to hold the additive medium 101. Assembly 100 may be configured to provide easy access to the additive medium 101 such that the medium 101 may be replaced when needed. The assembly 100 may be mounted to a wall of the cell, such as the top wall, so the user can gain access to it. For example, the cap may be threaded and screw into a threaded opening in the cell housing so the medium 101 is positioned in ionically conductive medium, thus allowing the assembly to be easily removed or replaced. Other mounting arrangements may be used. Container 102 may be made of a suitable inert polymer or plastic such as polypropylene. Container 102 may also be formed to any shape that provides electrolyte access to the additive medium 101 while preventing material from falling and making contact with the cell electrodes. For example, container 102 may be formed as a mesh basket as shown in the embodiment of FIG. 1 or as a perforated cup.

In one embodiment, assembly 100 is placed in an electrochemical cell such that the electrolyte level reaches a level L. Free corrosion of the additive medium 101 provides additional active additive to the electrolyte solution. The geometry (surface area/volume) of the medium 101 may be tailored to target a corrosion rate that (a) counterbalances loss of active, soluble species over time in order to maintain optimal concentration, or (b) acts to maintain a certain level of supersaturation if optimal is higher than the solubility limit. The additive medium 101 may be implemented in a variety of forms including foil, pellets, plugs, or shots. Medium 101 may be formed as a single metal material, or other material, or may be formed as coating or plating on a substrate. In one embodiment, additive medium 101 may be an indium foil. In another embodiment, additive medium 101 may be indium plated on nickel foil.

In other embodiments, the corrosion of the additive medium may be through galvanic corrosion wherein metal-containing additive medium comprising a first metal that corrodes preferentially over another metal in electrical contact to the first. FIGS. 2-5 show embodiments of galvanic corrosion.

Figure 2:
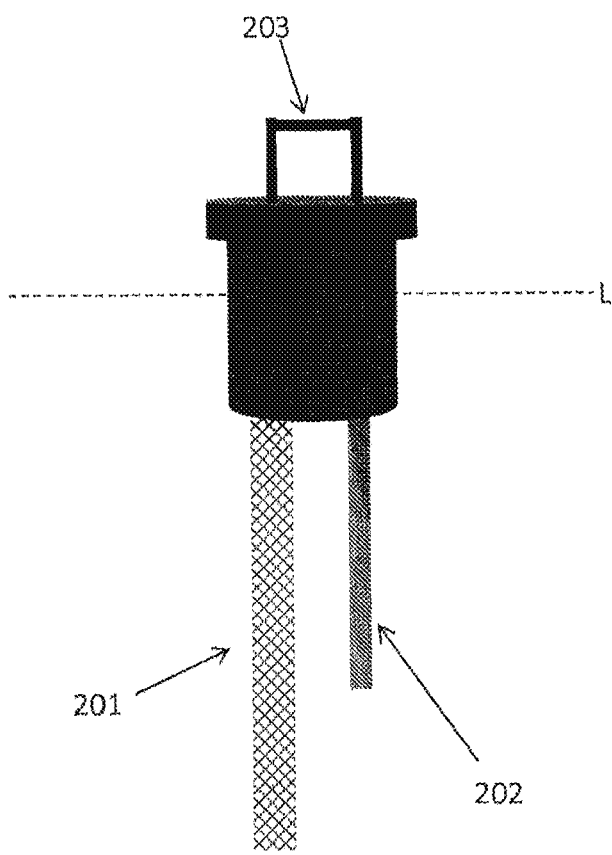
FIG. 2 shows an embodiment of an assembly for managing additives in an electrochemical cell comprising a direct connection of electrodes.

FIG. 2 shows an embodiment of assembly 200 that relies on direct shorting of corrosion couple. Assembly 200 may be placed in an electrochemical cell such that the electrolyte level reaches a level L so the medium 201 is immersed. Metal-containing additive medium 201 is electrically connected to counter electrode 202 (also immersed in the electrolyte) through connection 203. In some embodiments, metal-containing additive medium 201 may be an indium foil or an indium plated nickel foil. Counter electrode 202 may be any metal or alloy that is cathodic of the metal of the corroding metal-containing additive medium 201.

Figure 3:
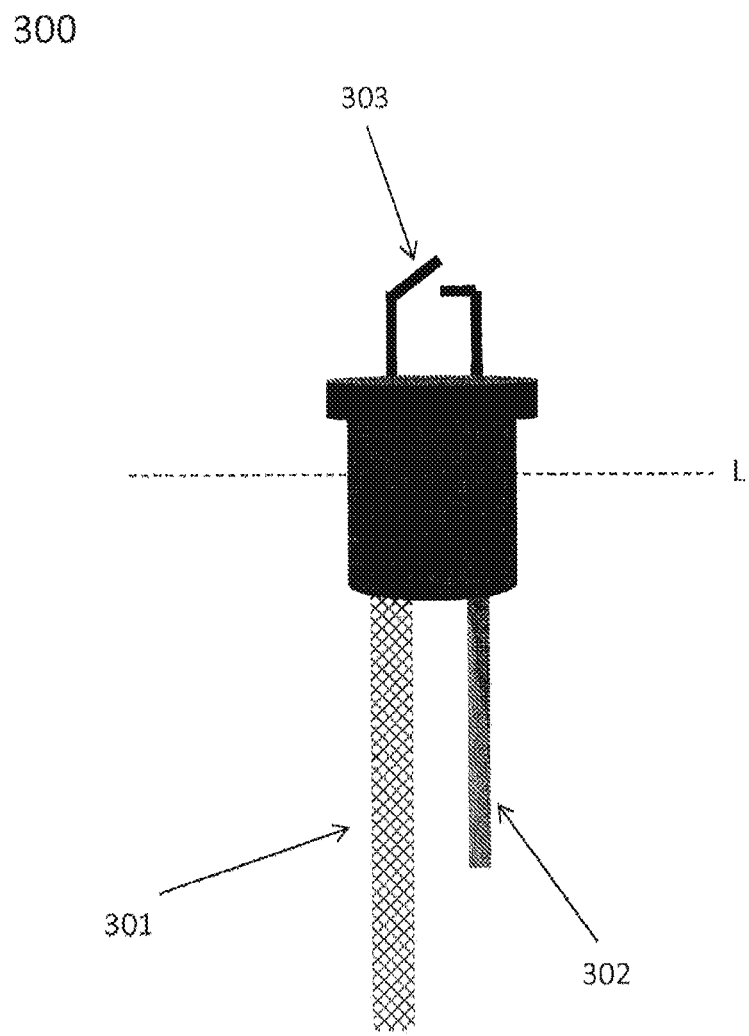
FIG. 3 shows an embodiment of an assembly for managing additives in an electrochemical cell comprising a switch.

FIG. 3 shows an embodiment of assembly 300 that employs a switch 303 to further control the rate and timing of additive addition to the electrolyte. Assembly 300 may be placed in an electrochemical cell such that the electrolyte level reaches a level L so the medium 301 is immersed. Switch 303 electrically couples additive medium 301 to counter electrode 302. In some embodiments, metal-containing additive medium 201 may be an indium foil or an indium plated nickel foil. Counter electrode 302 may be any metal or alloy that is cathodic of the metal of the corroding metal-containing additive medium 301.

Switch 303 between electrodes may be in a closed position during a charge mode, discharge mode and/or idle mode. As an example, the switch may be periodically closed for a predetermined amount of time during charge mode, discharge mode and/or idle mode. Switch 303 may be controlled as a function of an input. The input may be obtained through a sensor (not shown) such as a cell current sensor or voltage sensor. In such embodiments, the frequency and duration of switching may be determined by a charge capacity, discharge capacity, additive consumption, additive medium corrosion rates, a voltage measurement, a current measurement, a cycle number or a combination thereof. Also, the switch 303 may simply be operated on a time basis (i.e., every few days, weeks, months, etc.) without using a sensor input. In some embodiments, a hardware device (e.g. a microcontroller) may be used to store lookup tables or a formulae that relates rate of additive release to temperature, frequency of switching, duration of switching, state of charge or any other information relating to cell health.

Figure 4:
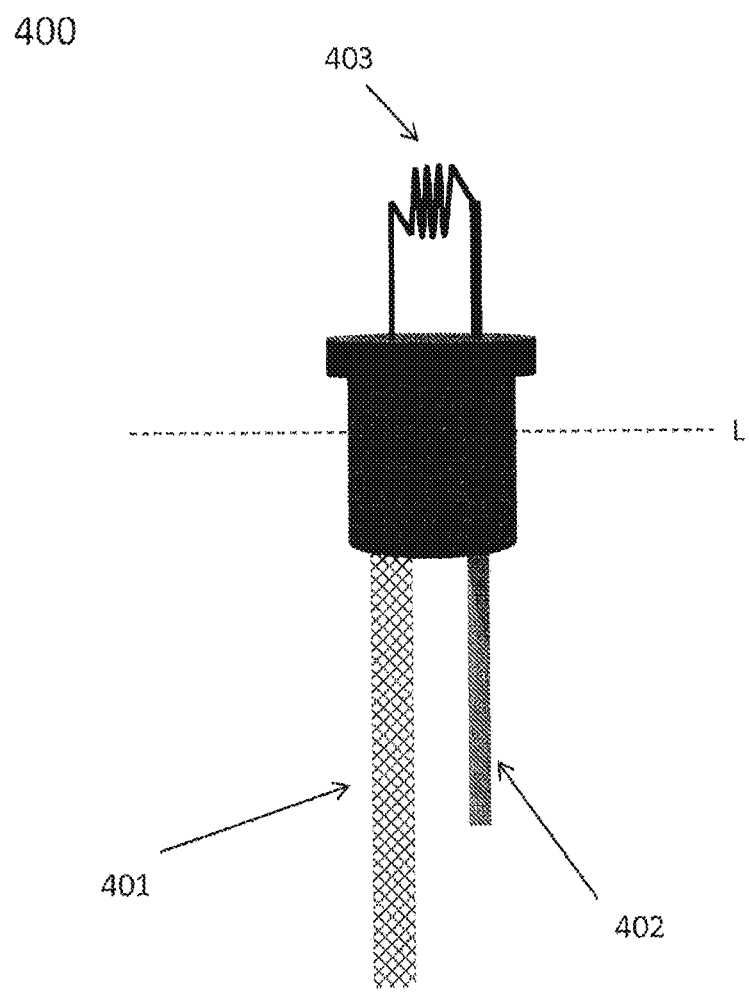
FIG. 4 shows an embodiment of an assembly for managing additives in an electrochemical cell comprising a variable resistor.

FIG. 4 shows an embodiment of assembly 400 that employs a variable resistor 403 to assist in controlling the galvanic corrosion of metal-containing additive medium

401. Assembly 400 may be placed in an electrochemical cell such that the electrolyte level reaches a level L so the medium 401 is immersed. Variable resistor 403 electrically couples metal-containing additive medium 401 to counter electrode 402. In some embodiments, metal-containing additive medium 401 may be an indium foil or an indium plated nickel foil. Counter electrode 402 may be any metal or alloy that is cathodic of the metal of the corroding metal-containing additive medium 401.

Variable resistor 403 provides resistance as a function of an input. The input may be obtained through a sensor (not shown) such as a cell current sensor or voltage sensor. In such embodiments, the resistance may be informed by battery current, voltage, operating time, charge capacity in/out, user command, or cycle history.

Figure 5:
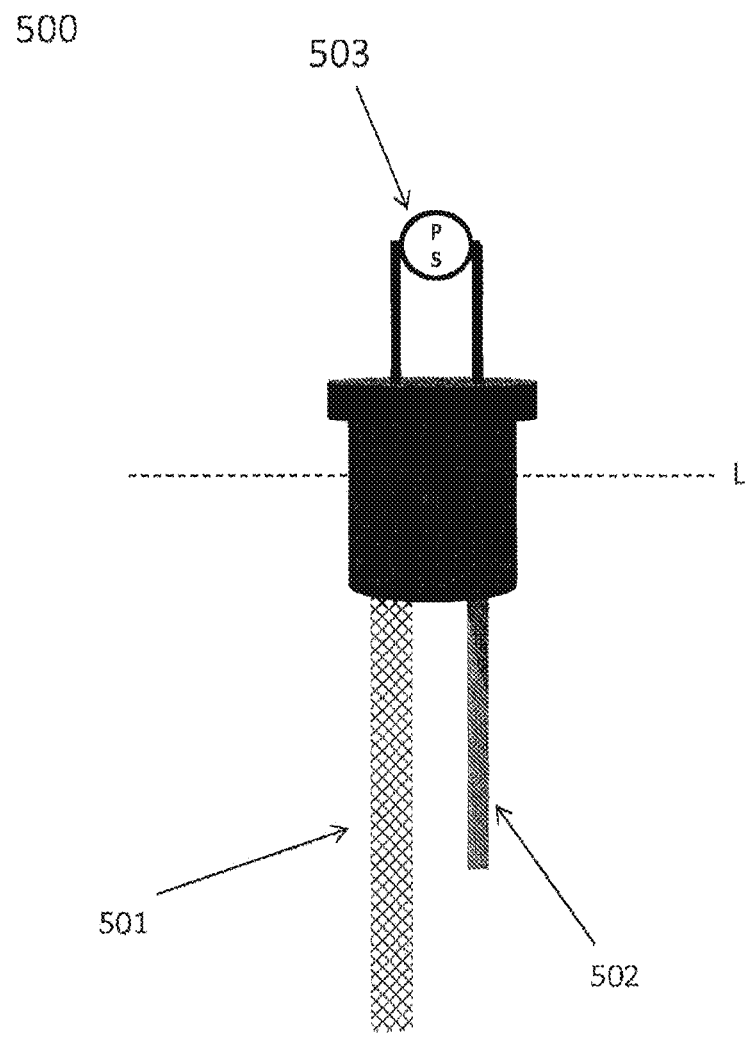
FIG. 5 shows an embodiment of an assembly for managing additives in an electrochemical cell comprising a power source.

FIG. 5 shows an embodiment of assembly 500 that employs an external power source PS to assist in controlling the galvanic corrosion of metal-containing additive medium 501. Assembly 500 may be placed in an electrochemical cell such that the electrolyte level reaches a level L. Metal-containing additive medium 501 is electrically coupled at 503 to counter electrode 502 through power source PS. In some embodiments, metal-containing additive medium 501 may be an indium foil or an indium plated nickel foil. Counter electrode 502 may be any metal or alloy that is cathodic of the metal of the corroding metal-containing additive medium 501.

Power source PS may be employed to assist in the galvanic corrosion of metal-containing additive medium 501 as a function of an input. The input may be obtained through a sensor (not shown) such as a cell current sensor or voltage sensor. In such embodiments, the addition of power source PS may be informed by battery current, voltage, operating time, charge capacity in/out, user command, or cycle history.

In other embodiments, a counterelectrode for just the metal-containing additive medium may be omitted and the electrochemical couple for corrosion may be established with another electrode already in the cell. For example, an electrochemical couple may be established with the air electrode, charging electrode, or the fuel electrode to create a potential difference to drive corrosion of the medium. Thus, the embodiments herein are not limited to a counter-electrode dedicated to electrochemical coupling with the additive medium.

Examples

Figure 6:
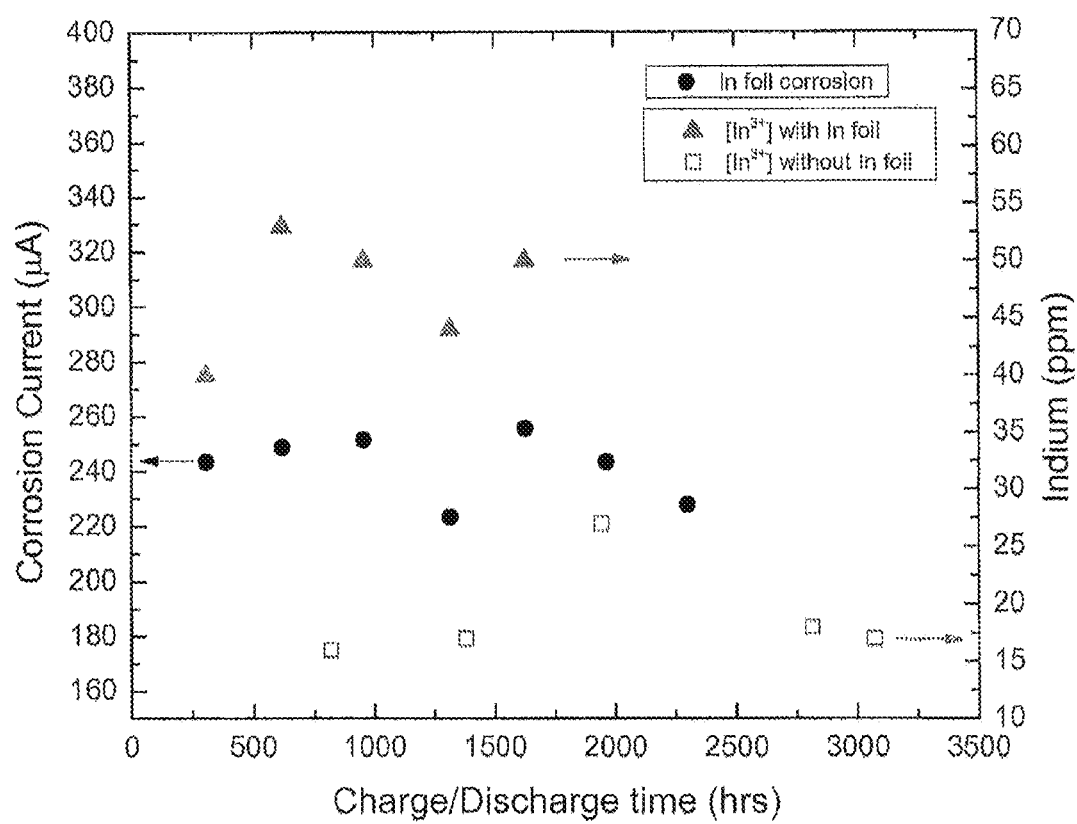
FIG. 6 is a graph showing the concentration of indium in an electrochemical cell as a function of automated dosing with an indium foil and through periodic manual dosing via injection of solvated indium into a cell.

FIG. 6 is an exemplary plot showing the benefits of automated dosing with an indium foil as opposed to periodic manual dosing via injection of solvated indium into a cell. The plot shows the corrosion current (filled circles, left axis) and resulting indate concentration in solution (filled triangles, right axis) of an indium foil immersed in a working metal-air cell. Also shown is indium concentration for a replicate cell without indium foil dosing (open squares, right axis). In this experiment, both cells started with 42 ppm indium in solution. The cell without the indium foil was manually dosed back to 42 ppm with an indium salt solution at 1800 hrs, which is responsible for the higher indium content seen at ca. 2000 hrs (open square). The indium foil is able to maintain optimal additive levels over long cell operation times under conditions of free corrosion.

Not to be bound by any particular theory but, the provided surface area of the additive medium will depend on additive consumption rates, corrosion current density, passivation current density specific to material in addition to electrolyte chemistry and volume. For example, the volume of indium provided will depend largely on corrosion rate and capacity/lifetime required for the cell. As a non-limiting example, the indium surface area to volume ratio may be in the range of 1-100 $cm^2$ to $cm^3$ per liter of ionically conductive medium. In this particular example, the dissolution rates of the active additive into the electrolyte will be relatively low.

Figure 7:
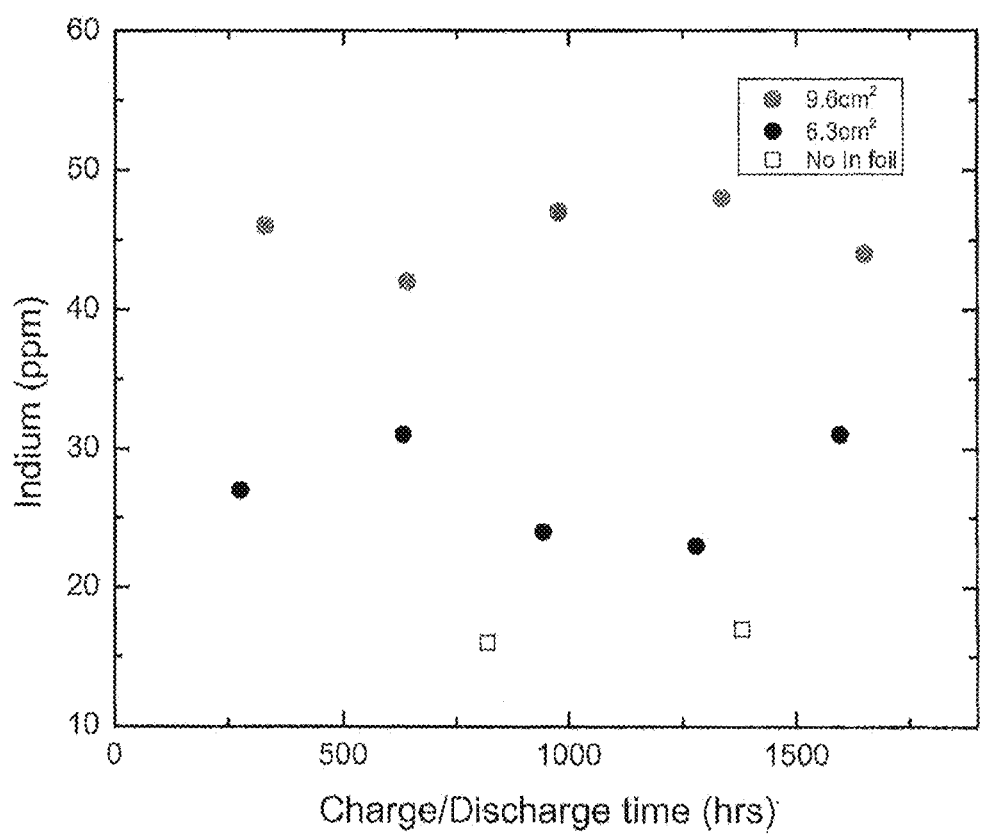
FIG. 7 is a graph showing the concentration of indium in the electrolyte as a function of varying surface areas of the indium source.

In another example, FIG. 7 depicts additive concentration (indium) in the electrolyte of three operating metal-air cells with varying surface areas of the additive medium (indium metal). The indium metal was provided with surface areas of 9.6 $cm^2$ (red filled circles, upper row filled circles), 6.3 $cm^2$ (black filled circles, lower row filled circles) and 0 $cm^2$ (no indium source) (open black squares). The cell with the higher surface area indium source maintains higher indium concentration due to higher corrosion current of the metal-containing additive medium.

In some embodiments relating to rechargeable cells operating according to an oxygen evolution reaction as the supporting reaction during charge, the rate of active additive release into the electrolyte, or metal corrosion rate of the metal-containing additive medium, is greater during a charge process than during a discharge or idle state. In this case, the effective corrosion rate is largely based on cell on-time (i.e. the lifetime of the corrodible metal is relatively insensitive to the ratio of idle time to total time). It may then be appreciated that the disclosure described herein may be especially beneficial for implementation in cells operating with an oxygen evolution reaction e.g. metal-air cells.

Figure 8:
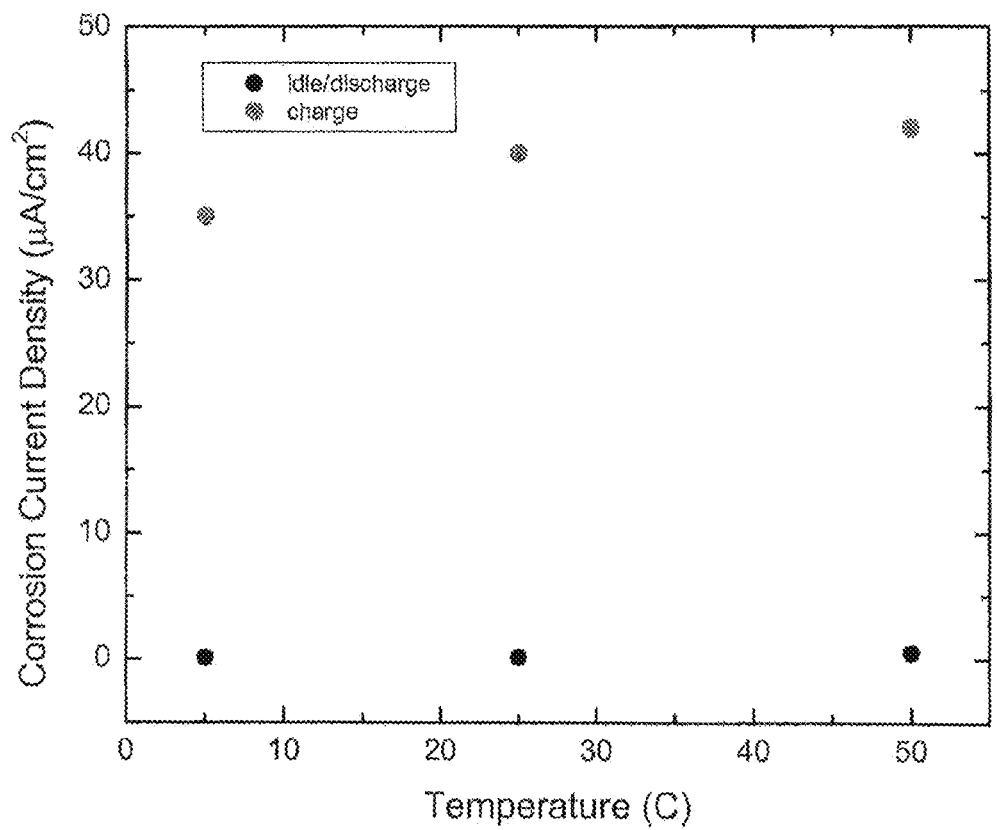
FIG. 8 is a graph showing the corrosion current density for an indium source in a metal-air cell during idle and discharge periods and during charge periods with oxygen saturated electrolyte.

As depicted in FIG. 8, the rate of indium dissolution is tied to charge time of the electrochemical cell, or charge capacity (Ah in) which is close to discharge capacity (Ah out). FIG. 8 depicts the corrosion current density for an indium source in a metal-air cell during idle and discharge periods (black filled circles, lower row filled circles) and during charge periods (red filled circles, upper row filled circles) with oxygen saturated electrolyte. It may be thus appreciated that since the corrosion rate is much lower during idle and discharge periods than charging periods, the active additive (e.g. indate) from the additive medium (e.g., in metal foil) is not wasted when not needed.

In the above-described embodiments using indium, indium or a species thereof served as the additive medium, and released a corroded/solvated species thereof to serve as the additive in the ionically conductive medium. In other embodiments, the additive may be contained in a casing that corrodes and/or dissolves to release the additive into the medium.

For example, in one embodiment the casing may be a metal or species thereof, or other material (e.g., polymer), that free corrodes or dissolves in the ionically conductive medium (like the embodiment of FIG. 1), and when it corrodes to the point of creating openings to expose the additive contained therein to the ionically conductive medium, the additive is thereby released to the ionically conductive medium.

Similarly to galvanic coupling approaches discussed above, the casing of metal or a metal species may be coupled to a potential to drive the corrosion (either by coupling to a dedicated counterelectrode or another electrode in the cell). This will also cause exposure and release of the additive to the ionically conductive medium. To make replacement of the casings easier, the basket or cup in which they are received may be conductive and have the corroding potential applied thereto. Thus, simple placement of the additive containing medium in the basket or cup would establish contact between the casing and basket/cup (thus applying the corroding potential to the casing by contact).

Figure 9:
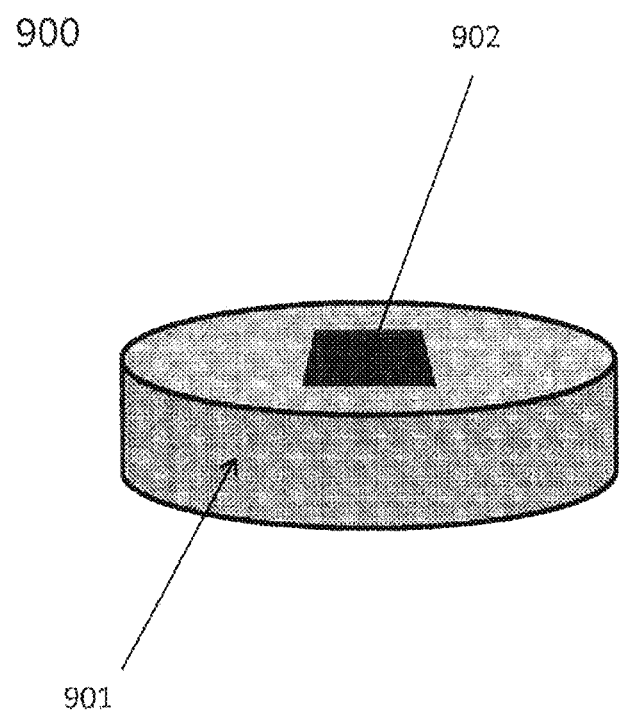
FIG. 9 shows an embodiment of an assembly for managing additives in an electrochemical cell comprising a hollow capsule containing additives and a corrodible window.

In either of the metal/metal species casings, the casing may be a foil pouch, a ball, box, or any other shape. The casing could also be partially inert, e.g. a plastic partial casing that receives the additive and that has an opening sealed by a metal or metal species foil that corrodes/ dissolves. An exemplary embodiment is shown in FIG. 9. Assembly 900 is a hollow disc-shaped capsule 901 having a window 902 on one surface. Capsule 901 may be made of a polymer stable to degradation in an ionically conductive medium such as polypropylene, polyethylene, polyacrylonitrile, etc. Capsule 901 may be filled with an additive medium. Window 902 may be covered with a corrodible metal provided as a foil or any other suitable shape. Once the metal corrodes, the interior chamber of capsule 901 is accessible to the ionically conductive medium such that any additive medium in the capsule 901 may be added to the ionically conductive medium.

Also, in either of these embodiments, to control multiple releases over time, different approaches may be used. For example, a set of casings of different thickness may be used, thus causing each casing to open and release additives at different times. Likewise, casings could be encased one within another, each with an amount of additive therein. Thus, when the outermost casing corrodes/dissolves, its additive releases, and corrosion/dissolution of the next casing begins, and so on until all the casings are dissolved.

Another technique is to have separate assemblies 100, or one assembly 100 with separate baskets/cups, and apply the corroding potential to each basket/cup individually at different times to corrode one casing at a time.

Figure 10:
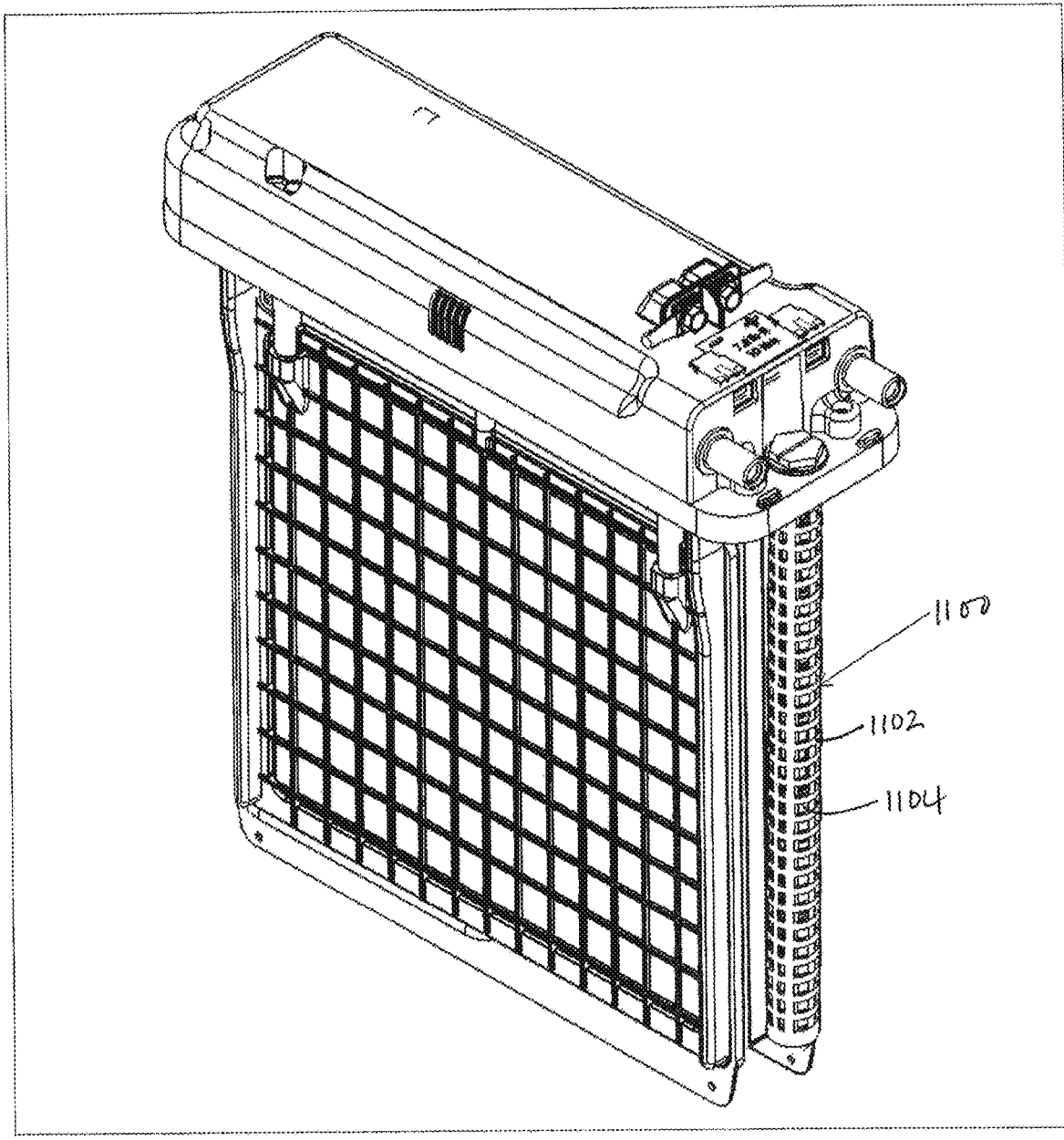
FIG. 10 shows a plan view of an embodiment of an assembly for managing additives associated with an electrochemical cell cover and housing comprising a dosing basket.

FIG. 10 shows an embodiment of an assembly 1100 associated with an electrochemical cell cover and housing comprising a dosing basket 1102. Assembly 1100 holds the replaceable additive medium 1104 containing the at least one active additive therein. The assembly 1100 may be mounted to a wall of the cell, such as the top wall or cover, so the user can gain access to it. For example, a top of the dosing basket 1102 may be threaded and designed to screw into a threaded opening in the cell housing or cover so the medium 1104 is positioned in the ionically conductive medium, thus allowing the assembly to be easily removed or replaced. Other mounting arrangements may be used, such as a fastener. Dosing basket 1102 may be made of a suitable inert polymer or plastic such as polypropylene. Dosing basket 1102 may be a perforated cup, as shown, or a mesh basket, or another container with holes or perforations or openings therein (e.g., in one or more walls) that allow for releasing of additive medium therefrom. Assembly 1100 may be placed in an electrochemical cell such that the electrolyte level reaches a level L so the medium 1104 is immersed. In some embodiments, additive medium 1104 may be an indium foil or an indium plated nickel foil, for example, whose dosing may be controlled via electrical contact or application of a charge (to cause its corrosion).

Figure 12:
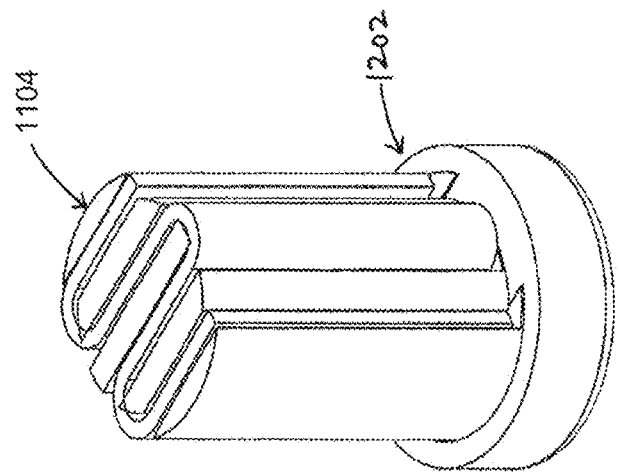
FIG. 12 is a detailed plan view of one of the dosing containers of FIG. 11 in the assembly of FIG. 10.
Figure 11:
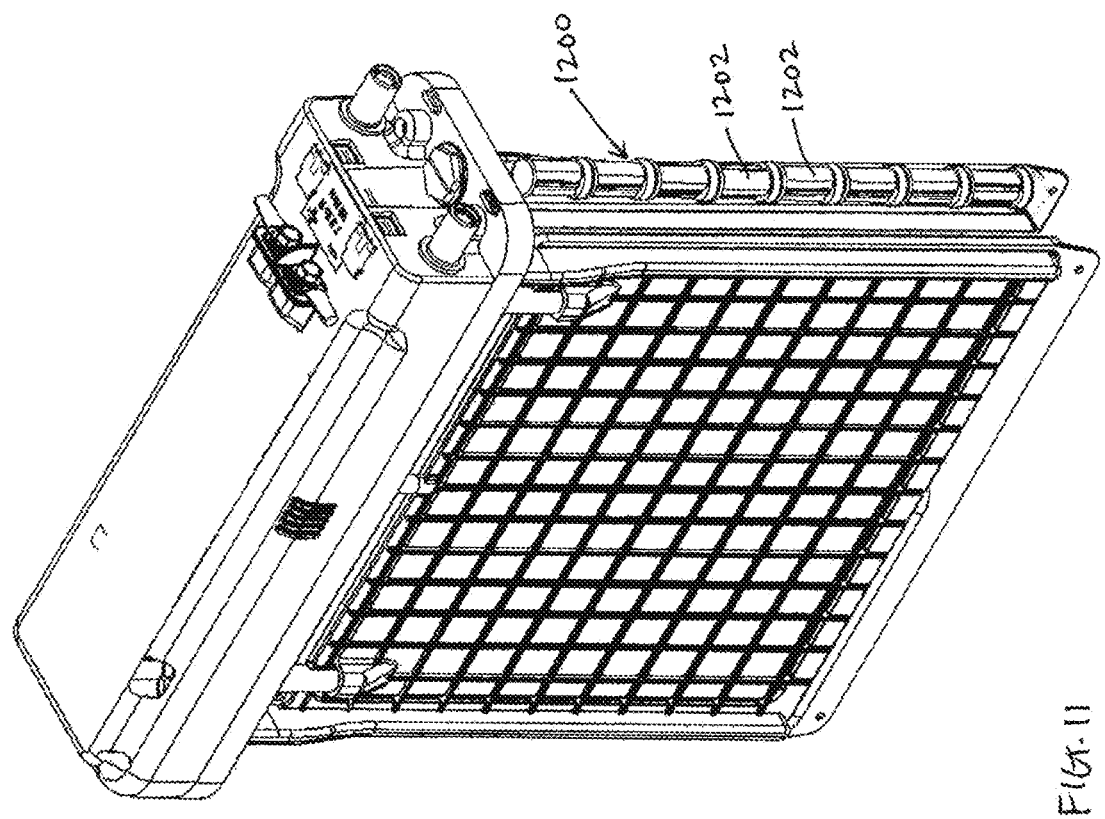
FIG. 11 shows a plan view of dosing containers within the dosing basket of the assembly shown in FIG. 10.

FIG. 11 shows the assembly 1100 from FIG. 10 with the dosing basket 1102 removed. More specifically, FIG. 11 shows a stack 1200 of dosing containers 1202 that are provided within the dosing basket 1102 of the assembly 1100, and with the additive media 1104 contained therein. The additive medium 1104 may be provided in a casing, carrier, or dosing container 1202, such as shown in greater detail in FIG. 12, for example. Multiple containers 1202 may be stacked (e.g., longitudinally, one on top of the other) in the assembly 1100. The additive medium 1104 may be, for example, a solid material that is wound around part of the container. The carrier may provide mechanical support to keep the solid additive material in place and in a proper orientation. However, the depiction of the additive medium 1104 and container parts shown in FIG. 12 is not intended to be limiting. In one embodiment, each of the containers 1202 themselves may be individual separate entities and removed or replaced one by one within the stack 1200 (as needed or desired, e.g., to replace the additive material). In another embodiment, the containers 1202 are connected in the stack 1200 in such a way that only the whole assembly or stack is removable from the basket 1102 or cell. Assembly 1100 may be placed in an electrochemical cell such that the electrolyte level reaches a level L so the medium 1104 of each container 1202 is immersed. In some embodiments, additive medium 1104 in assembly 1100 may be an indium foil or an indium plated nickel foil, for example, whose dosing may be controlled via electrical contact or application of a charge (to cause its corrosion).

Figure 13:
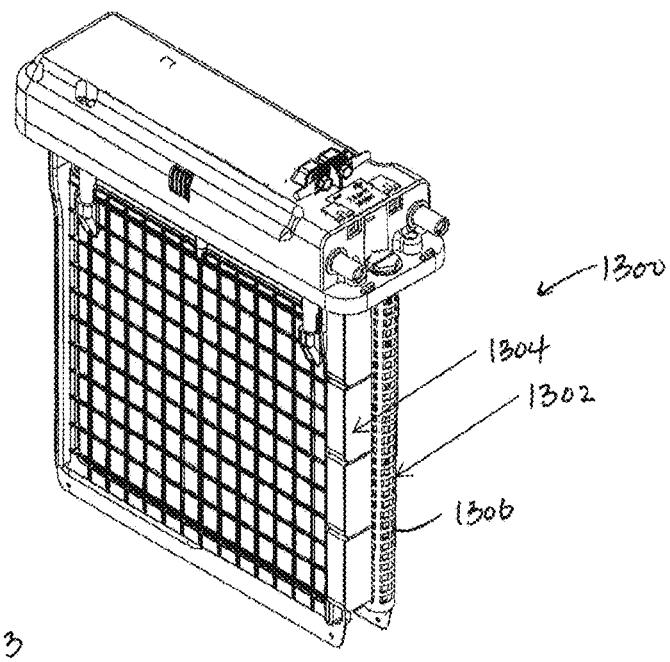
FIG. 13 shows a right plan view of an embodiment of an assembly for managing additives associated with an electrochemical cell cover and housing comprising a dosing basket and a dosing container.
Figure 14:
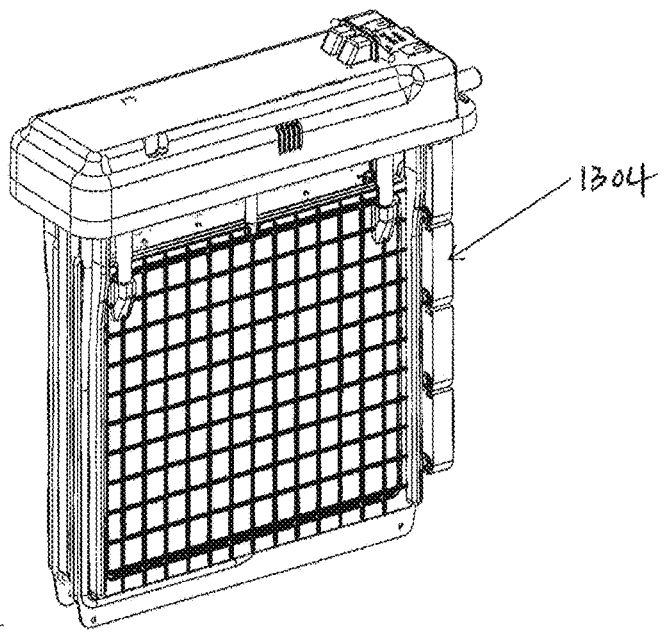
FIG. 14 shows a left plan view of the assembly and electrochemical cell housing of FIG. 13.
Figure 15:
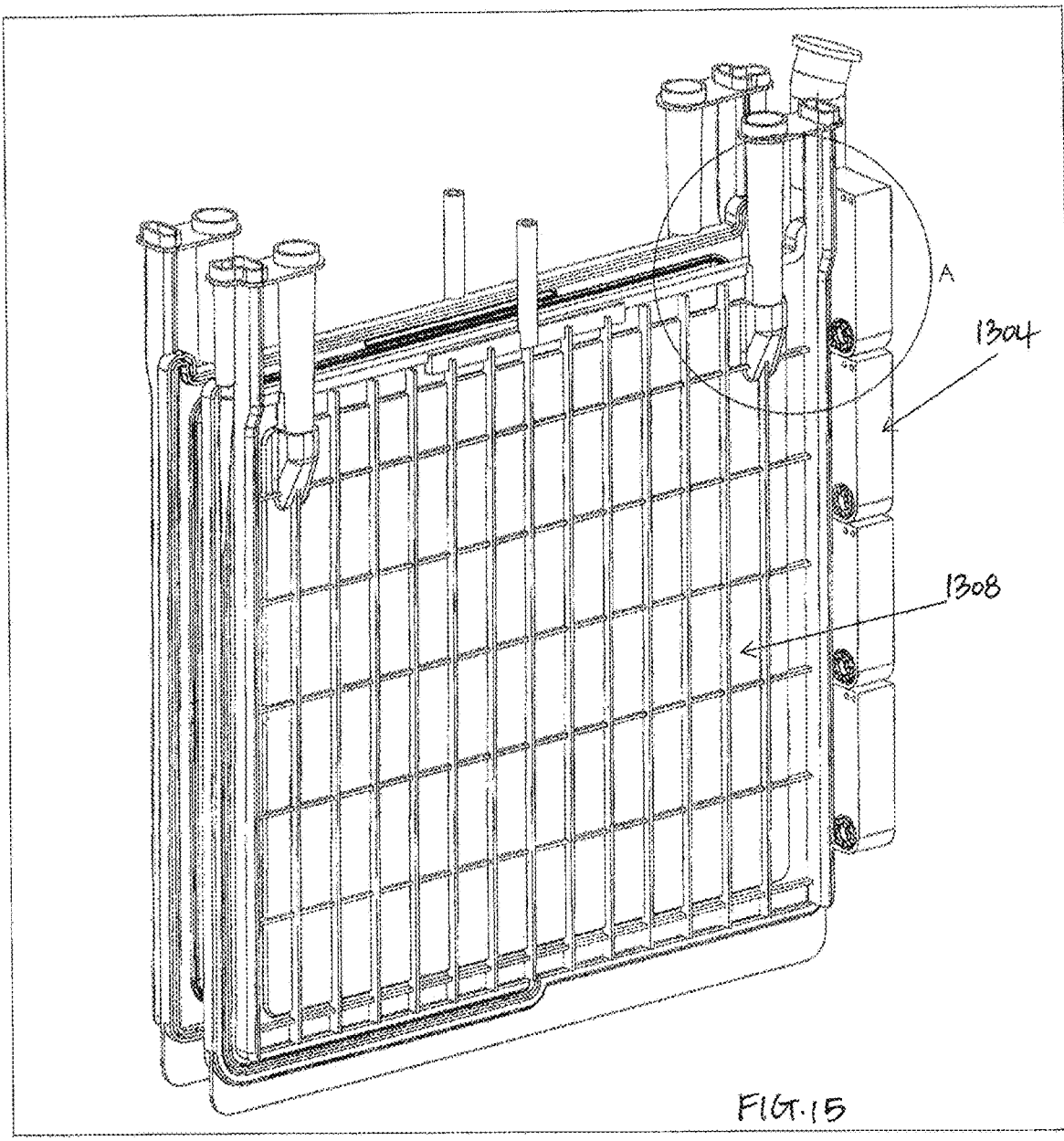
FIG. 15 shows a left plan view of the assembly and electrochemical cell housing of FIG. 13 without a cover.

FIGS. 13 and 14 show yet another embodiment of an assembly 1300 associated with an electrochemical cell cover and housing having both a dosing basket 1302 and a dosing container 1304. The assembly 1300 may be mounted to a wall of the cell, such as the top wall or cover. As similarly described with reference to FIG. 10 above, the dosing basket 1302 holds a additive medium 1306 containing the at least one active additive for corroding or dissolving therein. Dosing basket 1302 may be made of a suitable inert polymer or plastic such as polypropylene. Dosing basket 1302 may be a perforated cup, as shown, or a mesh basket, or another container with holes or perforations or openings therein (e.g., in one or more walls) that allow for releasing of additive medium therefrom. The dosing container 1304 may also contain an amount of additive medium with active additive therein. Dosing container 1304 may include multiple bodies that are stacked (e.g., longitudinally, one on top of the other) in the assembly 1300 and mounted near one side of the cell, as shown in FIGS. 15-18, e.g., near the oxidant electrode 1308. In one embodiment, the dosing containers 1304 are individually formed and mounted relative to one another. In another embodiment, the containers 1304 are integrally formed as a single container having with multiple reservoirs associated therewith. The containers 1304 may be separate entities (and separately removable) or connected together (and removable only as a whole unit). In another embodiment, the assembly may be a single cylinder that has separate and isolated compartments.

Figure 19:
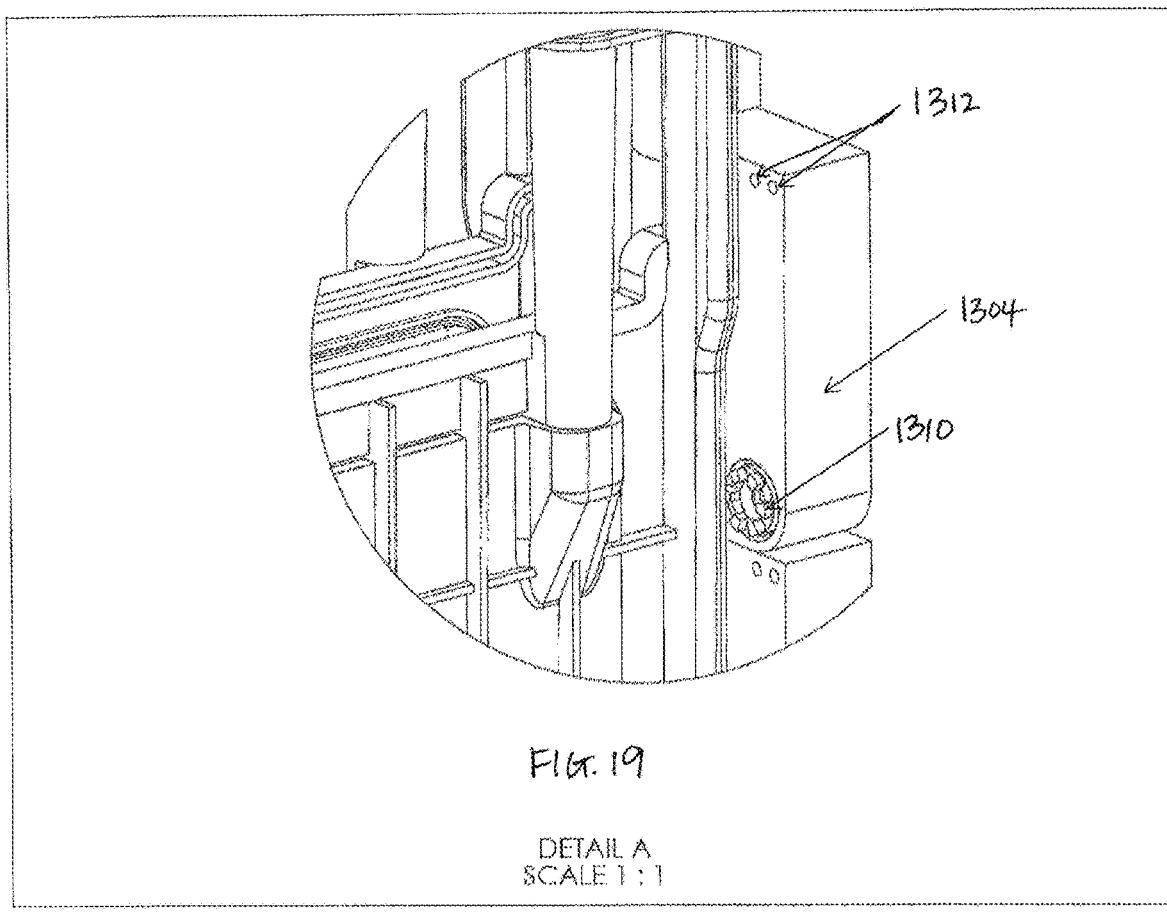
FIG. 19 shows a detailed view of part of the dosing container of the assembly of FIG. 13.

As shown in greater detail in FIG. 19, a part of the dosing container 1304 (or each dosing container) may include a dosing closure 1310 (or plug or cap) and one or more fill holes 1312 associated with its containing body. Each dosing closure 1310 is configured to meter and/or release one or more doses or dosages of additive medium into the electrochemical cell, e.g., from a cavity and through its reservoir. In one embodiment, the closure 1310 itself may corrode and/or dissolve to release a dose of additive medium from its associated reservoir. In another embodiment, the dosing closure 1310 may have a dissolvable and/or corrodible window, plate, or disk (or other part) associated therewith. For example, the window of the closure 1310 may be a dissolvable and/or corrodible metal window designed to dissolve and/or corrode and release additive medium therethrough. The window may be made of any material (including non-metals) capable for dissolving or corroding, however. The corrodible or dissolvable window may be used to isolate the additive medium until the window is breached due to interaction with the electrolyte on the outside, for example. In an embodiment, each of the compartments or containers 1304 holds an individual dose and may be breached at different times, depending on the window thickness. In one embodiment, the basket 1302 and/or container 1304 may be, at least in part, corrodible or dissolvable. In an embodiment, the additive medium within dosing container 1304 may be in solid, semi-solid, liquid, and/or fluid form in each of the reservoirs and configured for corroding and/or dissolving for release into the cell through the dosing closure 1310. The fill holes 1312 allow for adding, filling, and/or replacement of the additive medium into the container 1304 by a user.

FIGS. 20-22 illustrate details of a container, in accordance with one embodiment, that may be employed or stacked with other containers in an electrochemical cell, as shown in FIGS. 13 and 14, for example. As seen in FIG. 22, the container 1304 has a cavity 1314 or reservoir therein for holding the additive medium containing the at least one active additive for corroding or dissolving. The dosing closure 1310 connects to a delivery port 1316 of the container 1304 for delivering dosages of additive medium from the cavity 1314 and into the electrochemical cell. Further associated with the dosing closure 1310 is an O-ring 1318 and a disk 1320 adjacent the reservoir. The O-ring 1318 assists in securing the closure 1310 to the portion of the body of the container 1304 with the reservoir 1316. The closure 1310 may be press-fit onto the container 1304, for example. The disk 1320 is provided adjacent to the reservoir 1316 and I-O-ring 1318, as shown in FIGS. 21 and 22. In an embodiment, the disk 1320 includes a window 1322 that is dissolvable and/or corrodible in the ionically conductive medium to expose and release the active additive (from or contained in the cavity 1314) to the ionically conductive medium. For example, the window may lie adjacent an opening of the reservoir 1316 and cover the opening to contain the additive material within the cavity 1314 of the container 1304. In an embodiment, the entire disk 1320 is the dissolvable and/or corrodible part designed to dissolve or corrode in the ionically conductive medium to expose and release the active additive (from the cavity 1314) to the ionically conductive medium. The window in the disk, or the entire disk itself, may be formed from an indium foil or an indium plated nickel foil, for example.

In accordance with an embodiment, the dosing closures 1310 of the containers 1304 in the ionically conductive medium have corrodible and/or dissolvable windows of different thicknesses. For example, each closure may have a corrodible and/or dissolvable window of a different thickness. The different thicknesses allow for spreading the dose over multiple, smaller doses—rather than having a single dosing event—thereby maintaining tighter control over the additive concentration around an optimal level. In one embodiment, each disk 1320 (and/or its window) has a different thickness. Alternatively, each closure 1310 may have a different thickness.

Assembly 1300 may be placed in an electrochemical cell such that the electrolyte level reaches a level L so the mediums are immersed. In some embodiments, additive medium 1306 may be an indium foil or an indium plated nickel foil. In some embodiments, the fluid or liquid additive medium within dosing container 1304 is an organic species. In other embodiments, the additive medium is a solid organic species. In embodiments, the dosing closure 1310 is a dual purpose indium plug that retains the additive medium (e.g., liquid or solid organic species) within the container 1304 as well as is configured to dissolve and/or corrode to release the active additive. In other embodiments, the dosing closure 1310 has a separate plug body formed from indium and a corrodible (and/or dissolvable) window of indium foil or an indium plated nickel foil for releasing the active additive from the container 1304.

Figure 23:
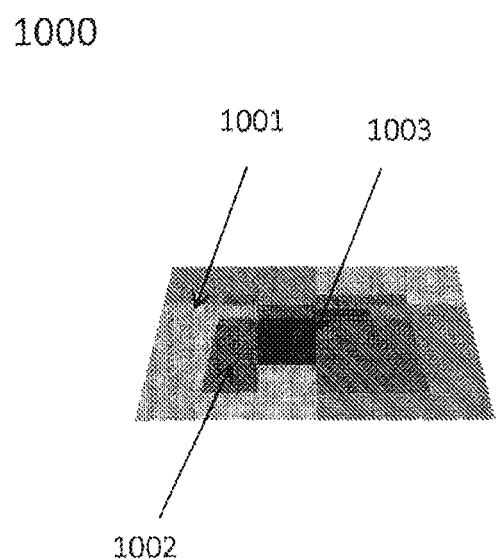
FIG. 23 shows an embodiment of an assembly for managing metal-containing additives in an electrochemical cell comprising layers of corrodible metal sheets with additives under the metal foil.

In the embodiment shown in FIG. 23, assembly 1000 comprises layers of corrodible metal sheets 1001, 1002, and 1003. In an embodiment, each layer of corrodible metal sheets 1001, 1002, and 1003 may be configured to release the active additive to the ionically conductive medium. Each layer of corrodible metal sheets may corrode at different rates. In an embodiment, additives may be provided under the metal sheets such that when the metal corrodes, the additives are released into the ionically conductive medium.

In some embodiments, the additive medium includes an active additive that does not contain any metal.

In other embodiments, the casing or container need not have any metal. For example, the casing could be a polymer that dissolves over time in the ionically conductive medium. The same casing configuration and approaches to time release management may be used as well. For example, polymers of different thicknesses could be used in a set of casings so that each additive medium releases its additive at a different time.

In any of these embodiments using a casing or container, for example, a wide range of additives may be used. For example, any of the additives mentioned in U.S. Patent Application Publication Nos. 20150221999, 20140266055, and 20120321969 and U.S. Pat. Nos. 9,147,919 and 8,741,491 (including all the additives having a diazobicyclic species) may be used. Each of those applications is incorporated herein by reference. In embodiments, a combination of different types of additive materials may be provided in an assembly (e.g., a combination of a solid additive material as well as a liquid or fluid additive material) within the cell.

The foregoing illustrated embodiments have been provided solely for illustrating the structural and functional principles of the present disclosure and are not intended to be limiting. For example, the present disclosure may be practiced using a variety of fuels, oxidizers, electrolytes, and/or overall structural configurations or materials. Thus, the present disclosure is intended to encompass all modifications, substitutions, alterations, and equivalents within the spirit and scope of the following appended claims.

What is claimed:

1. An electrochemical cell comprising:
   i. a fuel electrode for oxidizing a fuel;
   ii. an oxidant electrode for reducing an oxidant;
   iii. an ionically conductive medium for conducting ions between the fuel and oxidant electrodes to support electrochemical reactions at the fuel and oxidant electrodes;
      wherein the ionically conductive medium comprises at least one active additive for enhancing at least one electrochemical reaction within the electrochemical cell; and
      an additive medium in contact with the ionically conductive medium and containing the at least one active additive for corroding or dissolving in the ionically conductive medium, the additive medium comprising a first metal and a second metal, the second metal being more noble than the first metal, and, wherein the first metal and second metal are galvanically coupled such that the first metal corrodes and the additive medium is configured to release the at least one active additive to the ionically conductive medium to increase a concentration of the at least one active additive depleted in the ionically conductive medium.

2. The electrochemical cell according to claim 1, further comprising a charging electrode selected from the group consisting of (a) the oxidant electrode and (b) a third electrode, the electrochemical cell being rechargeable by applying a charging potential between the fuel electrode and the charging electrode such that the fuel electrode functions as a cathode for reducing a reducible fuel species as the fuel on the fuel electrode and the charging electrode oxidizes an oxidizable oxidant species.

3. The electrochemical cell according to claim 2, wherein the charging electrode oxidizes an oxidizable oxidant species to form oxygen.

4. The electrochemical cell according to claim 2, wherein the fuel electrode comprises a series of permeable electrode bodies arranged in spaced apart relation, wherein the spaced apart relation of the permeable electrode bodies enables the charging potential to be applied between the charging electrode and at least one of the permeable electrode bodies, with the charging electrode functioning as the anode and the at least one permeable electrode body functioning as the cathode, such that the reducible fuel species are reduced and electrodeposited as the fuel in oxidizable form on the at least one permeable electrode body, whereby the electrodeposition causes growth of the fuel among the permeable electrode bodies such that the electrodeposited fuel establishes an electrical connection between the permeable electrode bodies.

5. The electrochemical cell according to claim 2, wherein the at least one active additive is characterized by being depleted from the ionically conductive medium during recharging by being deposited together with the fuel.

6. The electrochemical cell according to claim 1, wherein the at least one active additive is characterized by being depleted from the ionically conductive medium through the formation of a derivative precipitate species.

7. The electrochemical cell according to claim 1, wherein the additive medium is shaped such that a surface area-to-volume ratio sets a corrosion rate of the additive medium to maintain a predetermined concentration of the at least one active additive within the ionically conductive medium.

8. The electrochemical cell according to claim 7, wherein the predetermined concentration of the at least one active additive is greater than a solubility limit of the active additive within the ionically conductive medium to maintain a supersaturated condition.

9. The electrochemical cell according to claim 1, wherein the additive medium is shaped such that a surface area-to-volume ratio is between 1-100 $cm^2$ to $cm^3$, per liter of ionically conductive medium.

10. The electrochemical cell according to claim 1, wherein the additive medium is shaped such that a corrosion current is consistent over the entire capacity/lifetime, thereby supplying enough active material at consistent rates for lifetime of the electrochemical cell.

11. The electrochemical cell according to claim 1, wherein the at least one active additive comprises indium, aluminum, iron, nickel, lead, magnesium, strontium, manganese, chromium, cadmium, tin, bismuth, germanium, antimony, tungsten, or combinations thereof.

12. The electrochemical cell according to claim 1, wherein the fuel is zinc and the ionically conductive medium comprises reducible zinc ions.

13. The electrochemical cell according to claim 1, wherein a corrosion rate of the first metal is set by a surface area of the second metal.

14. The electrochemical cell according to claim 1, wherein the electrochemical cell further comprises a resistor situated in operative electrical connection between the first metal and the second metal.

15. The electrochemical cell according to claim 1, wherein an oxidation rate of the first metal is increased by an external power supply in operative electrical connection between the first metal and the second metal.

16. The electrochemical cell according to claim 1, wherein the electrochemical cell further comprises a switch situated in operative electrical connection between the first metal and the second metal.

17. The electrochemical cell according to claim 16, wherein the switch is provided in a closed position during a charging operation of the electrochemical cell.

18. A method of adding an active additive to an electrochemical cell comprising: i. a fuel electrode for oxidizing a fuel; ii. an oxidant electrode for reducing an oxidant; iii. an ionically conductive medium for conducting ions between the fuel and oxidant electrodes to support electrochemical reactions at the fuel and oxidant electrodes; wherein the ionically conductive medium comprises at least one active additive and wherein the at least one active additive enhances at least one electrochemical reaction within the electrochemical cell; the method comprising:

disposing an additive medium in contact with the ionically conductive medium, the additive medium containing the at least one active additive for corroding or dissolving in the ionically conductive medium, the additive medium comprising a first metal and a second metal, the second metal being more noble than the first metal, and, wherein the first metal and the second metal are galvanically coupled such that the first metal corrodes to release the at least one active additive from the additive medium to the ionically conductive medium to increase a concentration of the active additive depleted in the ionically conductive medium.

19. The method according to claim 18, wherein the electrochemical cell further comprises a charging electrode selected from the group consisting of (a) the oxidant electrode and (b) a third electrode, the electrochemical cell being rechargeable by applying a charging potential between the fuel electrode and the charging electrode such that the fuel electrode functions as a cathode for reducing a reducible fuel species as the fuel on the fuel electrode and the charging electrode oxidizes an oxidizable oxidant species, and wherein the at least one active additive is characterized by being depleted from the ionically conductive medium during recharging by being deposited together with the fuel.

20. The method according to claim 18, wherein the at least one active additive is characterized by being depleted from the ionically conductive medium through the formation of a derivative precipitate species.

21. The method according to claim 18, wherein the at least one active additive comprises indium, aluminum, iron, nickel, lead, magnesium, strontium, manganese, chromium, cadmium, tin, bismuth, germanium, antimony, tungsten, or combinations thereof.

22. The method according to claim 18, wherein the electrochemical cell further comprises a resistor situated in operative electrical connection between the first metal and the second metal, and the method further comprising electrically coupling the first metal and the second metal via the resistor.

23. The method according to claim 18, further comprising increasing an oxidation rate of the first metal via an external power supply in operative electrical connection between the first metal and the second metal.

24. The method according to claim 18, wherein the electrochemical cell further comprises a switch situated in operative electrical connection between the first metal and the second metal, and wherein the method further comprises controlling a rate and a timing of the at least one active additive added to the ionically conductive medium via using the switch.

25. The method according to claim 24, further comprising providing the switch in a closed position during a charging operation of the electrochemical cell.

* * * * *